J. O'LEARY.
CAR FENDER.
APPLICATION FILED APR. 22, 1909.

939,953.

Patented Nov. 9, 1909.
2 SHEETS—SHEET 1.

Witnesses.
Robert Everett.

Inventor.
John O'Leary,
By James L. Norris
Atty.

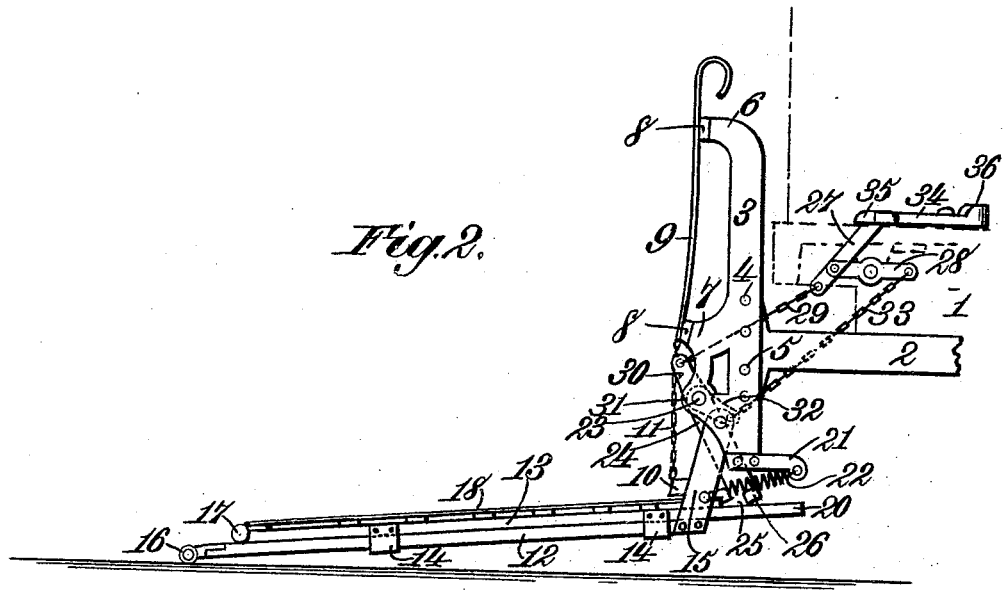
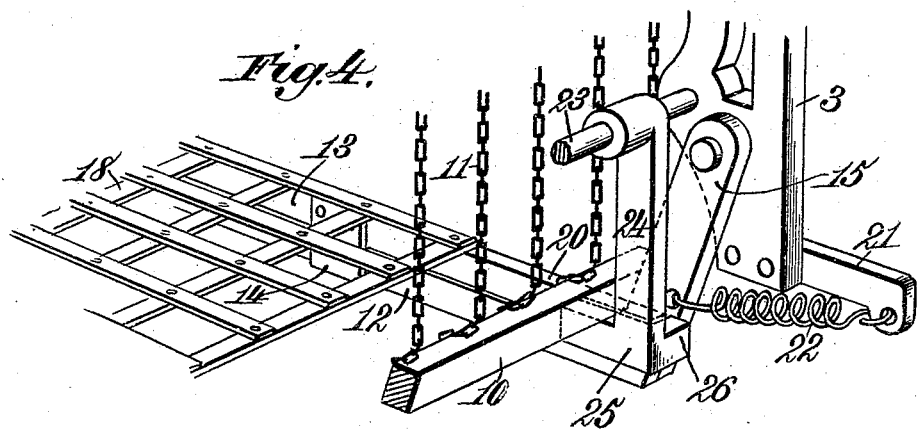
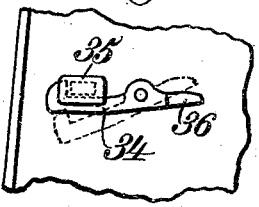

UNITED STATES PATENT OFFICE.

JOHN O'LEARY, OF COHOES, NEW YORK.

CAR-FENDER.

939,953.  Specification of Letters Patent.  Patented Nov. 9, 1909.

Application filed April 22, 1909.  Serial No. 491,560.

*To all whom it may concern:*

Be it known that I, JOHN O'LEARY, a citizen of the United States, residing at Cohoes, in the county of Albany and State of New York, have invented new and useful Improvements in Car-Fenders, of which the following is a specification.

This invention relates to car fenders, and the object in view is to provide an effective device of this character which is normally held elevated clear of the track rails or at such height that it will readily pass over ordinary track bed projections to which it is attached but may be automatically instantly released and lowered when striking abnormal objects traveling in the path of the car and cause such objects to be thrown over into the fender without injury to the latter or the objects. The fender is also under manual control of the motorman or driver and may be released from the car platform. In view of the dual operation of the fender, material advantages result in maintaining a clear track and in preventing human objects from passing under the fender and being injured by the car on which the fender is used. The improved fender is also adapted to be applied to any car now in use, as it does not require material change or modification of the car structure to operatively apply the fender thereto.

The fender involves other objects and advantages, which will be more fully hereinafter specified in connection with a preferred structure embodying the features of the invention.

Figure 1:
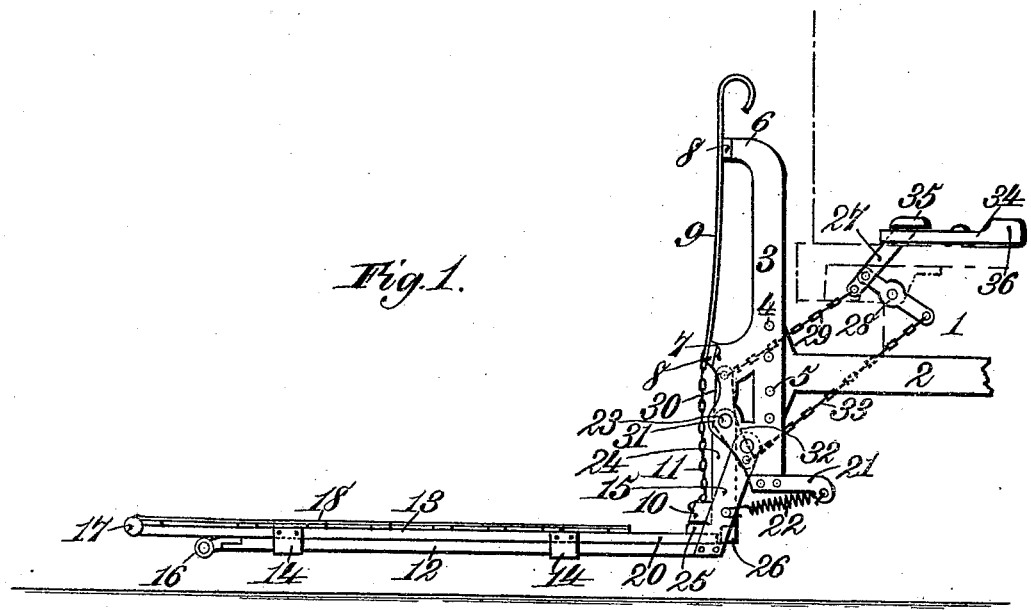
Figure 3:
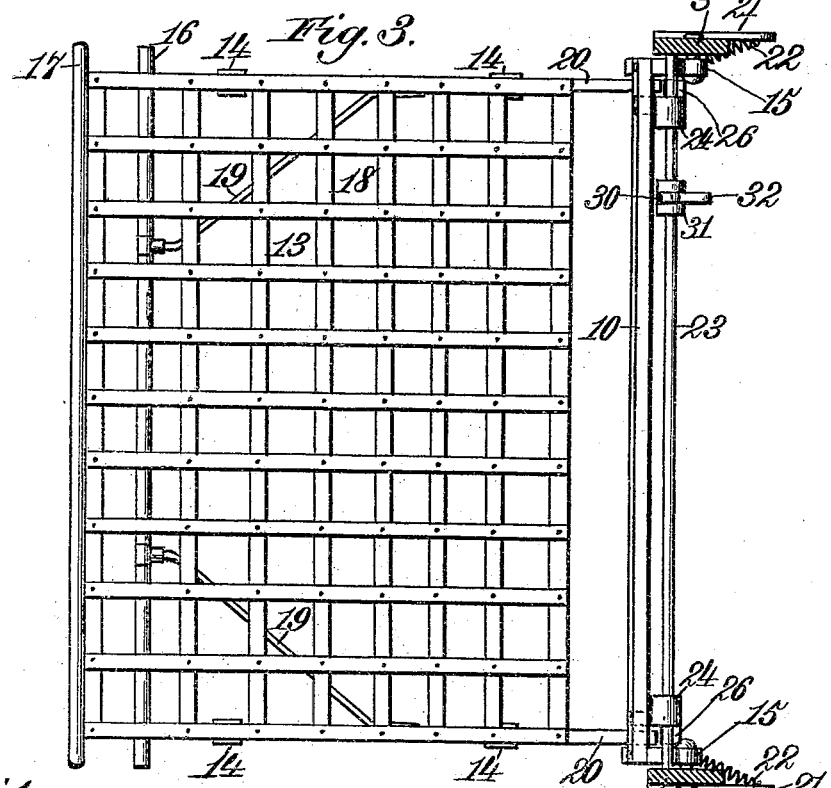

In the drawings: Figure 1 is a side elevation of a portion of a car end showing the improved fender applied thereto and illustrated in normal position. Fig. 2 is a similar view showing the fender as having been tripped and in lowered position. Fig. 3 is a sectional top plan view of the fender. Fig. 4 is a detail perspective view of a portion of the fender. Fig. 5 is a top plan view of a portion of the car platform showing a locking means arranged to coöperate with the manual actuating device for the fender.

The improved fender structure may be supported in any suitable manner and is shown applied to a car end and secured to sills 1.

The frame structure of the fender comprises a positive supporting means consisting of arms 2, one on each side, secured to the sills 1 and supporting at their front extremities vertical members 3 extending above and below the said arms, the vertical members being adjustable with relation to the arms 2 through the medium of a plurality of bolt openings 4 provided in excess of the number required to receive the bolts or fastening means 5 engaging the front extremities of the said arms and the portions of the vertical members 3 applied to the arms. The arms 2 serve as a means for rigidly holding the vertical members 3 in upright position, and said members 3 serve as a supporting means for the remaining parts of the fender. The adjustable assemblage of the vertical members 3 in relation to the forward extremities of the arms 2 permits the parts of the fender carried by the said vertical members and including the fender bed to be raised and lowered in accordance with the height of the car bed including the sills 1 above the track rails and also in accordance with the height it is desired to normally dispose the fender bed above the track rails. The vertical members 3 have forward projections 6 and 7 at their upper extremities and at intermediate points, the said projections being connected by transverse bars or supports 8, and attached thereto is a vertical spring bed or cushion 9 which acts as a rear buffer for the fender and against which an object thrown into the fender may impact or strike without shock or jar, or injury if the object so thrown be a human being.
The fender bed comprises a lower supporting frame 12 and an upper sliding frame 13, the latter preferably having clips 14 at opposite sides movably embracing or engaging the sides of the said lower supporting frame 12. The bed is movably attached to the lower extremities of the vertical members or uprights 3 by hangers 15 rigidly secured to the rear extremities of the sides of the supporting frame 12 and pivoted at their upper extremities to the said vertical members or uprights, and by means of this movable association of the bed with the lower extremities of the vertical members or uprights, the said bed when released will be permitted to fall from a normally horizontal position to a downwardly and forwardly inclined position, as shown by Figs. 1 and 2. The lower extremities of the hangers 15 are connected by a resistance bar 10 extending fully over and above the rear portion of the bed of the fender, and between the said resistance bar and the transverse support 8 applied to the intermediate projections 7 is a plurality of loose guard chains 11 to prevent objects thrown on the fender from passing backwardly through the rear portion of the latter. The front extremity of the supporting frame 12 is provided with downwardly projecting rollers 16 to engage the road bed when the fender bed is in lowered position, as shown by Fig. 2. The slide frame 13 has its front extremity normally projected in advance of the adjacent extremity of the supporting frame 12 and is provided with a nose bar or striker 17 extending fully thereacross, as clearly shown by Fig. 3. This nose or striker bar 17 may be covered or provided in any other suitable manner with a buffing or yielding means, as will be readily understood. The sliding frame 13 has a yielding covering or spring bed 18, preferably of the form shown by Fig. 3 or comprising intersecting slats having yielding characteristics. The supporting frame 12 between the front and side bars thereof has braces 19 to give the same sufficient rigidity and strength for practical service. It is proposed to construct all the parts of the fender bed of suitable pipe lengths arranged as shown in order to materially lighten the structure and to reduce the cost of manufacture by avoiding the formation of special castings and taking advantage of material that is readily obtainable in the market. The sliding frame 13 has the sides thereof projecting rearwardly in the form of release arms or projections 20, said release arms or projections moving closely to the inner sides of the hangers 15. Projecting rearwardly from the lower extremity of each vertical member or upright 3 is a fixed extension 21, and connected to the rear end of said extension is the rear terminal of a resistance spring 22, the front terminal of this spring being attached to the adjacent hanger 15 above the plane of movement of the adjacent arm 20 of the sliding frame. These springs 22, when the fender bed is disposed in horizontal position as shown by Fig. 1, are distended and exert a resistance to material vibration or bobbing of the front extremity of the fender bed while the car is traveling, and as soon as the fender bed is released the said springs are free to contract and draw rearwardly on the hangers 15 and cause an instant fall of the front extremity of the fender bed and also overcome any tendency to obstruction of movement of the fender bed when released that might be due to the rear extremity of the bed sticking or working sluggishly.

The fender bed is held in locked position in a horizontal plane by means of locking devices or dogs, clearly shown by Fig. 4, and illustrated in their two positions by Figs. 1 and 2. These dogs are fixed to and depend from a fulcrum rod 23 having its terminals movably held in the lower extremities of the vertical members or uprights 3 in advance of and above the points of attachment of the hangers 15 to the said vertical members. Each dog comprises a shank 24 with a lower foot 25 projecting forwardly therefrom in a plane at right angles or in such angular relation as to move under the resistance bar 10. The foot 25 has a rear heel or shoulder 26 on its outer side which is normally held in engaging alinement with the adjacent arm 20 of the sliding frame 13, each arm 20 coacting with one of the dogs and both arms moving simultaneously when the frame 13 is shifted rearwardly between the dogs and the hangers 15. When the fender bed is in normal position as shown by Figs. 1 and 4, the feet 25 of the dogs extend closely under and engage the lower edge of the resistance bar 10 and the heels or shoulders 26 are in position to be struck by the rear ends of the arms 20 of the sliding frame 13. The rear ends of the arms 20, however, are not in contact with the heels or shoulders 26 but are spaced a short distance from the latter so as to obviate accidental release of the dogs by vibration of the fender bed and consequent slight movement of the arms 20 of the sliding frame 13. The springs 22 also come into play in effecting a reliable set engagement of the locking devices or dogs with the resistance bar 10 and consequently the fender bed as a whole, by exerting on the fender bed, as hereinbefore explained, a resistance to abnormal vibration or bobbing of the said fender bed during the movement of the car. When the nose or striker bar 17 comes in contact with an object in the road bed the sliding frame 13 is forcefully moved rearwardly and simultaneously the locking devices or dogs are released by the arms 20 striking the heels or shoulders 26 and the feet of the dogs will be instantly cleared from locking engagement with the resistance bar 10 in view of the fact that the hangers 15 pivoted below and in rear of the pivotal points of the dogs or of the rod 23 cause the rear extremity of the fender bed to describe an arc slightly differing from that defined by the dogs or the feet of the latter and consequently there will be no jam of these coöperating parts.

The fender as thus far described has a self-releasing movement, and it will be permitted to have such movement under ordinary conditions. There may be times, however, when it is found expedient to manually release the fender, and for this purpose a trip bar 27 extends upwardly through the platform of the car and is connected to one arm of an equalizing lever 28, the lower extremity of the trip bar projecting below the arm of the lever 28 to which it is attached and has a flexible connection 29 secured thereto and also to the end of one arm 30 of a double crank arm 31 fixed on the rod 23, the remaining arm 32 of the double crank arm having a flexible connection 33 attached thereto and also to the remaining arm of the equalizing lever 28. From the foregoing it will be observed that when the trip bar 27 is depressed the equalizing lever 28 will be thrown from an angular position relatively to a horizontal plane and which it normally occupies, as shown by Fig. 1, when the dogs are in locking engagement with the fender bed, to the horizontal position shown by Fig. 2, and an operation will ensue based on the principle of the parallelogram of forces and the dogs will be drawn rearwardly or released. Subsequently the trip bar 27 may be elevated when the fender bed is restored to normal horizontal position and the dogs placed in locking engagement with said bed and under which conditions the lever 28, connections 29 and 33, and the arms 30 and 32 of the double crank arm 31 move in a reverse direction. The trip bar 27 may be held in elevated position by any suitable means to prevent movement thereof or to lock the fender against movement, which may be desirable at times and one instance of a suitable locking means is shown more particularly by Fig. 5, and consists of a horizontally disposed intermediately fulcrumed catch 34 to engage under the head 35 at the upper end of the trip bar, the rear extremity of the catch having an upwardly projecting tail piece or member 36 for engagement by the motorman. When this catch 34 is thrown around to take under the head 35 of the trip bar, as shown by Fig. 1, it will not only prevent depression of the bar but also obstruct release of the dogs in view of the fact that the connections 29 and 33 will prevent movement of the arms 30 and 32 of the double crank arm and hold the rod 23 against movement and therefore the dogs will remain in immovable engagement with the rear extremity of the fender bed. It will also be understood that the guard chains 11 limit the drop of the fender, said chains acting under these conditions as a suspending means which will remove the strain of the weight of the fender bed materially from the fulcrum means for the hangers 15 and also yieldingly suspend the fender bed.

The drop of the fender bed is always insured in view of the preponderance of weight thereof in advance of the fulcrum means provided therefor through the medium of the hangers 15, and owing to this provision the fender bed will be very sensitive in its operation as an effective pick-up means. The improved fender will also be found exceptionally advantageous in its general service and is economical in its use in view of the fact that the several parts are simple in construction and comparatively few in number and are also strong and durable and will not readily become broken or injured.

What is claimed is:

1. In a fender, the combination of a bed consisting of a lower supporting frame and a sliding frame held on the supporting frame, means fixed to the lower supporting frame for movably suspending the bed as a whole, means to which said suspending means is movably connected, locking devices having outer projections for engagement by rear portions of the sliding frame, and springs attached to the said suspending means and to the means to which the said suspending means is movably connected.

2. In a car fender, the combination of a bed consisting of a lower supporting frame and a sliding frame held on the supporting frame, pivoted means for movably suspending the bed, locking devices to engage a portion of the bed and adapted to be released by the sliding frame, and springs attached to the suspending means for the bed.

3. In a fender, the combination with a car end, of uprights secured thereto, a fender bed having suspended means pivoted to the uprights and including a sliding frame, locking devices having portions to engage the bed and released by the sliding frame, and springs coöperating with the rear portion of the bed.

4. In a fender, the combination of a bed including a sliding frame, means for movably suspending the bed and having a resistance device connecting the same, locking devices to engage the resistance device of the suspending means and adapted to be released by the sliding frame, and springs attached to the suspending means.

5. In a fender, the combination of a bed including a sliding frame, swinging means for movably suspending the bed, locking devices movably engaging portions of the suspending means, and means for throwing the bed downwardly when released.

6. In a fender, the combination of a bed consisting of a lower supporting frame and a sliding frame held on the supporting frame, means attached to the supporting frame for movably suspending the bed, locking devices coöperating with the rear extremity of the bed and the suspending means and releasable by the said sliding frame, and means for throwing the bed downwardly when released.

7. In a car fender, the combination of a bed including a sliding frame, means for movably suspending the bed, locking devices coöperating with the rear extremity of the bed and releasable by the sliding frame, a lever means and connections to the means for movably suspending the bed, a trip bar connected to said lever means, and means for locking said trip bar against movement.

8. In a fender, the combination of a main portion, a releasing frame slidably carried thereby, the said main portion and frame having swinging suspending means, and locking devices normally engaging the rear extremities of the said main portion of the fender to hold the latter in normal horizontal position, the locking devices being disengaged from their locking positions by the releasing frame.

9. In a fender, the combination of a main frame, a releasing frame slidably mounted therein, swinging suspending means for the main frame and releasing frame and locking devices having portions to engage the main frame and for contact with portions of the releasing frame.

In testimony whereof I have hereunto set my hand in presence of two subscribing witnesses.

JOHN O'LEARY.

Witnesses:
 MARCEL LEO COMEAU,
 WILFRED PALIN.